United States Patent [19]

Puskas

[11] 4,368,273

[45] Jan. 11, 1983

[54] PROCESS FOR THE UTILIZATION IN THE CERAMICS INDUSTRY OF RED MUD FROM ALUMINA PLANTS

[75] Inventor: Ferenc Puskas, Budapest, Hungary

[73] Assignee: Chemokomplex Vegyipari Gep-es Berendezes Export-Import Vallalat, Budapest, Hungary

[21] Appl. No.: 208,269

[22] Filed: Nov. 19, 1980

Related U.S. Application Data

[63] Continuation of Ser. No. 101,173, Dec. 7, 1979, abandoned, which is a continuation of Ser. No. 969,404, Dec. 14, 1978, abandoned, which is a continuation of Ser. No. 834,580, Sep. 19, 1977, abandoned, which is a continuation of Ser. No. 667,860, Sep. 19, 1976, abandoned.

[51] Int. Cl.$^3$ ............................................. C04B 35/00
[52] U.S. Cl. ..................................................... 501/155
[58] Field of Search ........................................ 501/155

[56] References Cited

U.S. PATENT DOCUMENTS

3,879,211  4/1975  Klotz ................................... 501/155

OTHER PUBLICATIONS

*Industrial Minerals & Rocks,* Seeley W. Mudd Series, Published by American Institute of Mining and Metallurgical Eng., N.Y., 1949, pp. 119-121.

Berry, L. G. et al., *Mineralogy,* Freeman and Co., San Francisco and London, 1959, pp. 465, 469, 499-510.

*Primary Examiner*—Mark Bell
*Attorney, Agent, or Firm*—Gabriel P. Katona

[57] ABSTRACT

Red mud from alumina plants, normally considered useless waste, is made into useful ceramics articles by mixing 51-90% by weight of red mud with 10-49% by weight of at least one mineral and/or silicate containing material, shaping the mixture and firing it at a temperature of 950°-1250° C.

7 Claims, No Drawings

PROCESS FOR THE UTILIZATION IN THE CERAMICS INDUSTRY OF RED MUD FROM ALUMINA PLANTS

This is a continuation of Ser. No. 101,173 filed on Dec. 7, 1979, which is a continuation of Ser. No. 969,404 filed on Dec. 14, 1978, which is a continuation of Ser. No. 834,580 filed on Sept. 19, 1977, which is a continuation of Ser. No. 667,860 filed on Sept. 19, 1976, all now abandoned.

This invention concerns a process for the utilisation of red mud from alumina plants in the ceramics industry by admixing mineral and/or silicate-containing additives with the red mud, shaping the mixture and firing it to ensure transformation into complex, water-insoluble silicates, spinels, $MgAl_2O_4$ and other double oxides.

As a result of recent accelerated industrial development there have been very great increases in the quantity of useful industrial products being manufactured. Regrettably, however, modern industry also produces ever-increasing amounts of useless, frequently harmful and environment-polluting by-products and waste, the economic industrial utilisation of which has not hitherto been achieved.

The present invention seeks to provide a process that can solve the problem of expediently and economically making industrial use of one of the more unpleasant by-products, a dangerous pollutant of the environment, namely red mud.

Numerous processes have been proposed for the industrial utilisation of red mud from alumina processing plants. The great majority of these processes is based on smelting the red mud. This fact is a logical corollary of the well-known high (approx. 35–60%) iron oxide content of red mud, but in spite of great efforts, men skilled in the art have not so far been able to develop a sufficiently economical smelting process. Naturally, attempts in this direction are still continuing.

Processes are known having the aim of recovering residual caustic soda and alumina in hydrated form by further processing the red mud to improve the economics of alumina processing. In some cases the red mud is used for the production of water-soluble sodium salts, mainly sodium sulphate, and of iron sulphate. Finally, a smaller member of processes are also known for using red mud as an additive in the ceramics industry.

Further, a process is known wherein firstly red mud is mixed with 5–30%, b.u. of organic or inorganic water-binding material having a particle size of at most 4 mm, then, relative to the dry matter content of the thus produced mixture, 50–80%, b.u. of clay containing more than 18% alumina is mixed in, the mixture is shaped and fired. By this process bricks and roof tiles are advantageously produced.

On the basis of the process proposed in the present invention, there is added to red mud amounting to 51–90% (b.u.; all further references to percentage in this specification and claims being also by weight) of the dry content of the final mixture, before and/or after de-watering of the red mud, silica, or quartz sand, or silicate minerals—such as phyllosilicates, inosilicates, mesosilicates, tectosilicates—or silicate-containing industrial waste, or urban waste, or volcanic rock from primary depths or from the surface, or oil-shale residue, or loess, or dolomite, singly or in any desired mixture, in an amount of 10–49% of the final mixture, provided that if plastic clays are used, they constitute at most 7.5% of the mixture and if dolomite is used, it constitutes at most 15%, both with other additives as set out above, then the components are mixed until the mixture is uniform; if necessary, the mixture is de-watered, and then shaped in the wet state and/or dried, or, if desired, shaped in a semi-dried condition; and finally shaped bodies of the mixture are fired at a temperature between 950°–1250° C.

In the interest of increasing the economy and effectiveness of the process such red mud additives have been selected and used which, as will be seen from the description, not only achieve the desired aim of ensuring that stable, water-insoluble ceramic or pottery products are obtained, but also make it possible for a significant proportion of mineral and industrial and urban waste materials that are becoming a problem from the point of view of environmental protection, to be utilised.

In the course of developing the invention the effect of all those mineral and silicate-containing materials on the physical and chemical properties of red mud has been investigated, which materials are in a powdery condition either in their natural state or become so during mining and their industrial processes, i.e. require no grinding and at most only sieving, and which materials are available—relative to the already built-up or collected red mud waste—in sufficient quantity to ensure continuity of utilisation. In addition, the effect has been investigated also of those silicate-containing materials that result from industrial activity or become waste during processing of silicate-containing materials. Finally, there has been performed an investigation of silicate-containing materials that form a significant proportion of urban refuse and are not comminuted in normal conditions, even after relatively long periods.

The following silicate minerals have been investigated and found suitable for admixing with red mud in the amount of 10–49%: from the group of laminar silicates (phyllosilicates), the serpentine minerals, $Mg_6(OH)_8 \cdot Si_4O_{10}$, such as chrysolite and antigorite, mineral talc and talc shale, $Mg_3Si_4O_{10}(OH)_2$, as well as clays, from which, when desired, plastic clays have been used to increase the green strength in an amount of 8.5% maximum; from the group of inosilicates, wollastonite, $CaSiO_3$ and sillimanite, $Al_2SiO_3$; from the group of mesosilicates, zircon, $ZrSiO_4$ and forsterite, $Mg_2SiO_4$; from the group of tecto-silicates, potash feldspar (orthoclase), $KAlSi_3O_8$, and anorthite, $CaAl_2Si_2O_8$.

From among surface and primary volcanic rocks the following have been investigated and found suitable for adding to red mud in an amount of 10–49%: andesite, basalt, dacite, dolerite, phenolite, granite, perlite, rhyolite, tephrite and trachyte.

Dolomite has been examined and found usable for adding to the red mud mixed with other additives and in an amount not exceeding 15% without risk of cracking in the ceramic or pottery product.

Further, the following have been examined; diatonite (amorphous silica), oil-shale residue (clay marl, clay schist), flying dust of silicate-containing materials, loess (clayey-limey-quartz sand), pure marine quartz sand and ground glass waste or cullet. All have been found suitable for the purpose of addition to the red mud in an amount of 10–49% and for forming ceramic products from the mixture.

Having regard to the fact that it is considered impossible or impracticable to describe in a respective Example of this invention every single substance that has been investigated and found suitable for adding to red mud, or indeed every possible composition of additive and red mud, the following Examples are given by way of representative, non-limiting illustration.

EXAMPLE 1

As a first step, the dry matter content of the available red mud is determined. In the case of a fresh filter cake, the dry matter content varies between 50–70%, while red mud freshly obtained from processing contains about 15–30% dry matter. In accordance with the actual dry matter content or red mud, the additive may be mixed in either before or after de-watering or filtering if its particle size is 1 mm or less, except for glass powder, quartz sand, wollastonite, zircon sand, primary volcanic rocks, tufftype volcanic surface rocks. It is expedient to add these excepted materials to the slurry before dewatering with a particle size of 0.1 mm or less. The small particle size of the additive can ensure, even at lower firing temperature, that the red mud is completely transformed into water-insoluble silicates, spinels and other double oxides. If the additives are added into the red mud slurry, the removal of water from the latter is improved and thus the moisture content of filter cakes can be reduced to 20–25%, in the same apparatus.

In the case of fresh red mud, mixing-in of the additives is performed with a bladed rotary mixer, while in the case of red mud filter cake it is performed by a wet roller or, more advantageously, by a kneader-mixer. Wet shaping of the mixture (e.g. for brick production) is effected on a screw press at a moisture content of 20%. For shaping or forming from semi-dry powder the mixture is dried to reduce its moisture content to 5–8% and is brought to the desired shape and size on a rotary press or a brick press. For floor and wall covering plates the mixture is pressed with the glass. Forming from semi-dry powder may also be carried out, e.g. in the case of preparing light concrete additive, by producing balls of 5–25 mm on a continuously operating disc granulating machine. For this purpose a mixture of 60% of red mud and 40% of oil-shale residue of 1 mm or smaller particle size is particularly advantageous. From this same mixture excellent split facing plates or cladding may be made by wet shaping.

EXAMPLE 2

It has been found that a semi-dry powder mixture of 70% of red mud and 30% of chrysolite, or diatomaceous earth, or volcanic rock from the surface or primary depths in a particle size of 0.5 mm or less is suitable for preparing floor and wall covering plates by pressing. Mixtures of 90% red mud and 2% bentonite and 8% ground glass of particle size of 0.5 mm or less; 80% red mud, 5% bentonite, 15% wollastonite of 0.5 mm or smaller particle size; and 51% red mud, 4% bentonite and 45% loess, are suitable for brick production by wet forming. Bricks may be pressed from semi-dry powders of mixtures of 70% red mud, 30% wollastonite (0.5 mm particle size or smaller); 80% red mud, 20% ground glass (0.5 mm particle size of smaller); 85% red mud and the following, all being in a particle size of 0.5 mm or less, namely 5% dolomite, 5% wallastonite, and 5% basalt or andesite.

By pressing a semi-dry powder, one may make good fire-resistant furnace brick (fire brick) from a mixture of 51% red mud, 4% bentonite, and 45% ziron sand or sillimanite, while heat-insulating furnace brick of high pirosity may be made similarly from a mixture of 75% red mud, 20% ground glass or wollastonite, and 5% diatomaceous earth.

EXAMPLE 3

By ensuring that the particle size of the additive(s) is 0.1 mm or less and by mixing into a slurry with the red mud such that the dry matter content of the slurry is 30%, a granulate suitable for pressing may be prepared by a spray-drying device. This is advantageous in the production of a mixture for making wall cladding or tiles, where the preferred mixtures have the following compositions: 80% red mud, 5% bentonite, 5% dolomite, 10% wollastonite or tephrite or andesite; and 75% red mud, 5% dolomite and 20% loess. The green ceramic bodies formed from semi-dry powder are expediently fired in a continuously operating sandwich furnace wherein they are disposed in one layer and without previous-drying. Products prepared by wet forming are dried before firing. The firing time in the sandwich furnace is 2–8 hours, while in a tunnel furnace with carriage conveying it is 36–72 hours.

The firing temperature for common bricks is 950°–1050° C., for facing bricks, 1050°–1150° C., for wall tiles 1000°–1100° C., for porous floor and wall plates 1050°–1150° C., for dense (klinker) bricks, floor and wall plates 1100°–1200° C., for light, closed microporous concrete additive and wall covering plates 1100°–1080° C., for heat-insulating bricks 1000°–1200° C. and finally, for heat-resistant bricks (firebricks) 1150°–1250° C. Depending on the furnace used and the peak temperature employed, the products are kept at that peak temperature for ½–6 hours. The bulk density of bricks prepared according to the invention is 1–1.5 kg/dm$^3$, their compressive strength is 100–200 kp/cm$^2$, water absorptivity 10–15%. The corresponding parameters for facing bricks are 1.5–2.5 kg/dm$^3$, 200–373 kp/cm$^2$ and 5–10%. The corresponding parameters for wall covering tiles are 1.25–1.75 kg/dm$^3$, 150–250 kp/cm$^2$ and 10–20%. The corresponding parameters for porous floor and wall plates are 1.5–2.25 kg/dm$^3$, 250–500 kp/cm$^2$ and 4–8%. The corresponding parameters for dense klinker bricks, floor and wall covering plates are 2.3–2.7 kg/dm$^3$, 500–1500 kp/cm$^2$ and 0–3%. Light, closed porous concrete additive and wall covering plates have a density of 2.3–2.7 kg/dm$^3$, a bulk density of 1.1–1.5 kg/dm$^3$, and water absorptivity of 0–1%. Heat-resistant bricks have a bulk density of 0.8–1.3 kg/dm$^3$, density of 2–2.5 kg/dm$^3$, porosity of 45–70%, compressive strength of 50–150 kp/cm$^2$ and heat resistance of 1150°–1200° C. The bulk density of heat resistant bricks (firebricks) is 2–2.8 kg/dm$^3$, compressive strength of 200–500 kp/cm$^2$ and heat resistance of 1300° C.

I claim as my invention:

1. In a process for manufacturing of ceramics wherein a starting mixture is formed into a green ceramic product and is subsequently fired to produce the finished ceramic product, the improvement which comprises preparing said starting mixture by mixing ingredients consisting essentially of from 51–90% dry weight basis of red mud and at least one silicate containing waste material from mining or manufacturing operations wherein the silicate content of said waste material is selected from the group consisting of at least one member of the group of inosilicates, masosilicates, tectosilicates, primary volcanic silicate rock material, surface volcanic silicate rock material, silicate residue material from oil shale processing, and loess, and said step of firing is carried out between 950 and 1,250 degrees centigrade, until the mixture is converted into a water-insoluble spinel or other double oxide ceramic product.

2. A process according to claim 1, in which said red mud is de-watered before mixing with said inorganic materials.

3. A process according to claim 1, in which said mixture is de-watered before said shaping.

4. A process according to claim 1, in which said mixture is shaped in a half-dry state.

5. A process according to claim 1 characterized in that as additive, the powdery spoils/dead rock of silicate minerals and/or volcanic rock from the surface or from primary depths is used.

6. A process according to claim 1 characterized in that as additive the flying dust of silicate-containing materials is used.

7. A ceramic prepared according to the process of claim 1.

* * * * *